(12) United States Patent
Lee (10) Patent No.: US 7,018,528 B2
(45) Date of Patent: Mar. 28, 2006

(54) PORTABLE PURIFYING SYSTEM

(76) Inventor: F. Donald Lee, 13603 W. Holly St., Goodyear, AZ (US) 85338

( * ) Notice: Subject to any disclaimer, the term of this patent is extended or adjusted under 35 U.S.C. 154(b) by 67 days.

(21) Appl. No.: 10/758,796

(22) Filed: Jan. 15, 2004

(65) Prior Publication Data

US 2004/0159597 A1    Aug. 19, 2004

Related U.S. Application Data

(60) Provisional application No. 60/447,790, filed on Feb. 14, 2003.

(51) Int. Cl.
*B08B 3/10* (2006.01)
*B08B 3/14* (2006.01)
*B01D 17/02* (2006.01)
*B01D 17/032* (2006.01)

(52) U.S. Cl. ............ 210/167; 210/223; 210/232; 210/538; 134/109; 134/110

(58) Field of Classification Search ............ 210/167, 210/222, 223, 232, 261, 416.1, 435, 459, 210/460, 473, 538; 134/107, 108, 109, 110, 134/172, 198
See application file for complete search history.

(56) References Cited

U.S. PATENT DOCUMENTS

| | | | | |
|---|---|---|---|---|
| 1,654,247 A | * | 12/1927 | Egan | 210/164 |
| 1,851,172 A | * | 3/1932 | Gordon | 210/149 |
| 2,095,241 A | * | 10/1937 | Cox | 4/638 |
| 2,099,061 A | * | 11/1937 | Gordon | 210/130 |
| 2,638,221 A | * | 5/1953 | Carroll | 210/301 |
| 2,907,052 A | * | 10/1959 | Louis et al. | 134/110 |
| 2,919,029 A | * | 12/1959 | Smith | 210/305 |
| 3,206,657 A | * | 9/1965 | Moriya | 335/303 |
| 3,688,781 A | * | 9/1972 | Talley, Jr. | 134/56 R |
| 4,202,289 A | * | 5/1980 | Bils | 118/50 |
| 5,470,466 A | * | 11/1995 | Schaaf | 210/222 |
| 5,752,532 A | * | 5/1998 | Schwenkler | 134/102.3 |
| 5,954,071 A | * | 9/1999 | Magliocca | 134/109 |
| 6,019,110 A | * | 2/2000 | McClure et al. | 134/56 R |

\* cited by examiner

*Primary Examiner*—Fred G. Prince
(74) *Attorney, Agent, or Firm*—Stoneman Law Offices, Ltd.; Martin L. Stoneman (57) ABSTRACT

A portable purifying system for improved filtering and/or separating of cleaning solutions such as solvents, particularly those used in parts washers. The purifying system utilizes a removable reservoir to provide a smaller reservoir within a larger reservoir such as a parts washer. The portable purifying system provides an apparatus and method of use to perform the following steps: using re-circulating solvent from the larger reservoir, washing oily parts in such manner that oily residue from the washed parts is deposited in the smaller reservoir; separating cleaner portions of solvent from dirtier portions of solvent within the smaller reservoir using density differences to separate by gravity action cleaner portions from dirtier portions; moving the cleaner portions of solvent into the larger reservoir; and periodically emptying and cleaning the smaller reservoir.

24 Claims, 6 Drawing Sheets

FIG. 13

PORTABLE PURIFYING SYSTEM

The present application is related to prior provisional application Ser. No. 60/447,790, filed Feb. 14, 2003, entitled "PORTABLE PURIFYING SYSTEM", from which priority is claimed, the contents of which are incorporated herein by this reference and are not admitted to be prior art with respect to the present invention by the mention in this cross-reference section.

BACKGROUND

This invention relates to providing a purifying system for purifying cleaning solutions such as solvents being used for washing oily components, particularly those used in parts washers (such as auto parts washers). Solvents for parts washers typically include petroleum distillate solvents or aqueous cleaning solvents. This invention relates most generally to aqueous cleaning solvents; however, it may be useful with petroleum distillate solvents as well.

Typically, parts washers are used to clean parts that are dirty and remove waste products such as hydrocarbons, oils and metallic shavings. Parts washers typically have a basin with an attached hose (one or more) for dispensing the cleaning solvent onto the parts. The parts are typically placed in the basin and the cleaning solvent poured over the parts while being washed (washing includes scrubbing, brushing and soaking). The unwanted material from the parts is washed down a drain in the basin, most typically back into a reservoir below or adjacent the basin. Typically, the cleaning solvent is pumped from a large reservoir beneath the basin such that the cleaning solvent is re-circulated. Again, as the parts are washed, a great deal of waste is removed from the parts such as dirt, metals and assorted oils. These sediments and oils are mixed with the cleaning solvent and eventually degrade the cleaning solvent, thereby reducing its effectiveness such that it must be replaced. Such cleaning solvents are costly both to purchase when new and to dispose of when old (as they are generally considered to be hazardous materials, especially when used).

Furthermore, there are often metals and other such debris in the solvent that are undesirable and may even damage the re-circulating pump, typically located near the bottom of the reservoir. It would be advantageous to have a purifying system that would prolong the life of the solvent. It would also be advantageous to have a purifying system that would better protect the pump mechanism. It would also be advantageous to provide a means for removing oils from the solvent thereby increasing the useful life of the solvent.

OBJECTS OF THE INVENTION

A primary object and feature of the present invention is to provide a purifying system for purifying the solvent and filtering out oils and debris such that the life of the solvent would be prolonged.

It is a further object and feature of the present invention to provide such a system that is portable and easily cleaned.

It is a further object and feature of the present invention to provide such a system that reduces the amount of hazardous waste generated by current parts washers.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a portable purifying system comprising, in combination: first reservoir means, comprising a first configuration, at least one upper rim portion, at least one open top portion, and at least one side wall for collecting, through such at least one open top, at least one mixture comprising a first ratio of at least one desired material and at least one second ratio of at least one undesired material; gravity means for using gravity to separate differing densities among the at least one first ratio of the at least one desired material and the at least one second ratio of the at least one undesired material; retrieving means for retrieving, from at least one selected location in such at least one first reservoir means, a higher ratio of the at least one desired material; and outlet means for providing an outlet spill outside such first reservoir means; wherein such retrieving means comprises debris separating means for separating debris from the at least one desired material; wherein such first configuration of such first reservoir means comprises such gravity means; and wherein such retrieving means comprises substantially vertical cylinder means for forming at least one passageway from the at least one selected location to such outlet means, such outlet means being at least as high as at least one location adjacent such upper rim portion of such first reservoir means.

Moreover, it provides such a purifying system further comprising: second reservoir means for holding essentially the at least one desired material; wherein such first reservoir means is removably situate within such second reservoir means. Additionally, it provides such a purifying system wherein such retrieving means comprises filtering means restricting passage of the at least one such undesired material. Also, it provides such a purifying system wherein such first reservoir means is portable. In addition, it provides such a purifying system further comprising at least one support means for supporting such first reservoir means within such second reservoir means. And, it provides such a purifying system wherein such first reservoir means is removably attached to at least one washbasin. Further, it provides such a purifying system wherein such filtering means comprises polypropylene means for filtering oils from at least one such desired material.

In accordance with another preferred embodiment hereof, this invention provides in combination: at least one first reservoir, comprising a first configuration, at least one upper rim portion, at least one open top portion, and at least one side wall, adapted to collect, through such at least one open top, at least one mixture comprising a first ratio of at least one desired material and at least one second ratio of at least one undesired material; at least one gravity separator to use gravity to separate differing densities among the at least one first ratio of the at least one desired material and the at least one second ratio of the at least one undesired material; at least one retriever to retrieve from at least one selected location in such at least one first reservoir, a higher ratio of the at least one desired material; and at least one outlet adapted to provide at least one outlet spill outside such at least one first reservoir; wherein such retriever comprises at least one debris separator to separate debris from the at least one desired material; wherein such first configuration of such at least one first reservoir comprises such at least one gravity separator; and wherein such at least one retriever comprises at least one substantially vertical cylinder to form at least one passageway from the at least one selected location to such at least one outlet, such at least one outlet being at least as high as at least one location adjacent such upper rim portion of such at least one first reservoir.

Even further, it provides such a purifying system further comprising: at least one second reservoir structured and arranged to hold essentially the at least one desired material; wherein such at least one first reservoir is removably situate within such at least one second reservoir. Moreover, it provides such a purifying system wherein such at least one retriever comprises at least one filter restricting passage of the at least one such undesired material. Additionally, it provides such a purifying system wherein such first reservoir is portable. Also, it provides such a purifying system further comprising at least one support adapted to support such at least one first reservoir within such at least one second reservoir. In addition, it provides such a purifying system wherein such first reservoir means is removably attached to at least one washbasin. And, it provides such a purifying system wherein such at least one filter comprises polypropylene structured and arranged to filter oils from the at least one such desired material. It also provides at least one first O-ring adapted to removably couple such at least one oil-blocking filter to such at least one inlet. And, it provides at least one second O-ring adapted to provide at least one seal between such at least one outlet portion and such at least one sidewall of such at least one reservoir.

In accordance with another preferred embodiment hereof, this invention provides a portable purifying system comprising, in combination: at least one portable reservoir comprising a first configuration, at least one upper rim portion, at least one open top portion, and at least one side wall, adapted to collect, through such at least one open top, at least one mixture comprising a first ratio of at least one desired material and at least one second ratio of at least one undesired material; at least one vertical cylinder, having at least one inlet portion to retrieve from at least one selected location in such at least one portable reservoir, a higher ratio of the at least one desired material, and at least one outlet portion adapted to provide at least one outlet spill outside such at least one first reservoir; wherein such at least one vertical cylinder is attached to such at least one reservoir such that such at least one inlet portion draws from at least one selected location within such at least one reservoir and such at least one outlet portion outlets through such at least one side wall outside of such at least one reservoir; and wherein such first configuration of such at least one reservoir comprises at least one gravity separator to use gravity to separate differing densities among the at least one first ratio of the at least one desired material and the at least one second ratio of the at least one undesired material.

Further, it provides such a purifying system further comprising at least one oil-blocking filter removably covering such at least one inlet. Even further, it provides such a purifying system further comprising at least one magnetic attractor located within or closely adjacent such at least one reservoir. Even further, it provides such a purifying system wherein such at least one magnetic attractor is located near at least one bottom portion of such at least one reservoir. Even further, it provides such a purifying system wherein such at least one reservoir has a fluid capacity of about five gallons. Even further, it provides such a purifying system wherein such at least one reservoir comprises one 5-gallon bucket.

Even further, it provides such a purifying system wherein such at least one vertical cylinder comprises PVC pipe. Even further, it provides such a purifying system further comprising at least one washbasin. Even further, it provides such a purifying system further comprising: at least one support, having at least one circumferential band and at least three support legs attached to such at least one circumferential band; wherein such at least one reservoir is removably supported by such at least one support. Even further, it provides such a purifying system wherein such at least three support legs comprise PVC pipe. Even further, it provides such a purifying system further comprising at least one height adjuster structured and arranged to adjust the height of such at least one support.

In accordance with another preferred embodiment hereof, this invention provides a portable purifying system comprising, in combination, the steps of: means for providing a smaller reservoir within a larger reservoir; means for using re-circulating solvent from the larger reservoir, washing oily parts in such manner that oily residue from the washed parts is deposited in the smaller reservoir; means within the smaller reservoir, for separating cleaner portions of solvent from dirtier portions of solvent; means for moving the cleaner portions of solvent into the larger reservoir; and means for periodically emptying and cleaning the smaller reservoir. Even further, it provides such a purifying system wherein the step of separating comprises the step of: means for using density differences to separate by gravity action cleaner portions from dirtier portions.

In accordance with another preferred embodiment hereof, this invention provides a portable purifying system comprising, in combination, the steps of: providing a smaller reservoir within a larger reservoir; using re-circulating solvent from the larger reservoir, washing oily parts in such manner that oily residue from the washed parts is deposited in the smaller reservoir; within the smaller reservoir, separating cleaner portions of solvent from dirtier portions of solvent; moving the cleaner portions of solvent into the larger reservoir; and periodically emptying and cleaning the smaller reservoir. It also provides such a system wherein the step of separating comprises the step of: using density differences to separate by gravity action cleaner portions from dirtier portions.

DETAILED DESCRIPTION OF BEST MODES AND PREFERRED EMBODIMENTS OF THE INVENTION

Figures 1, 2:
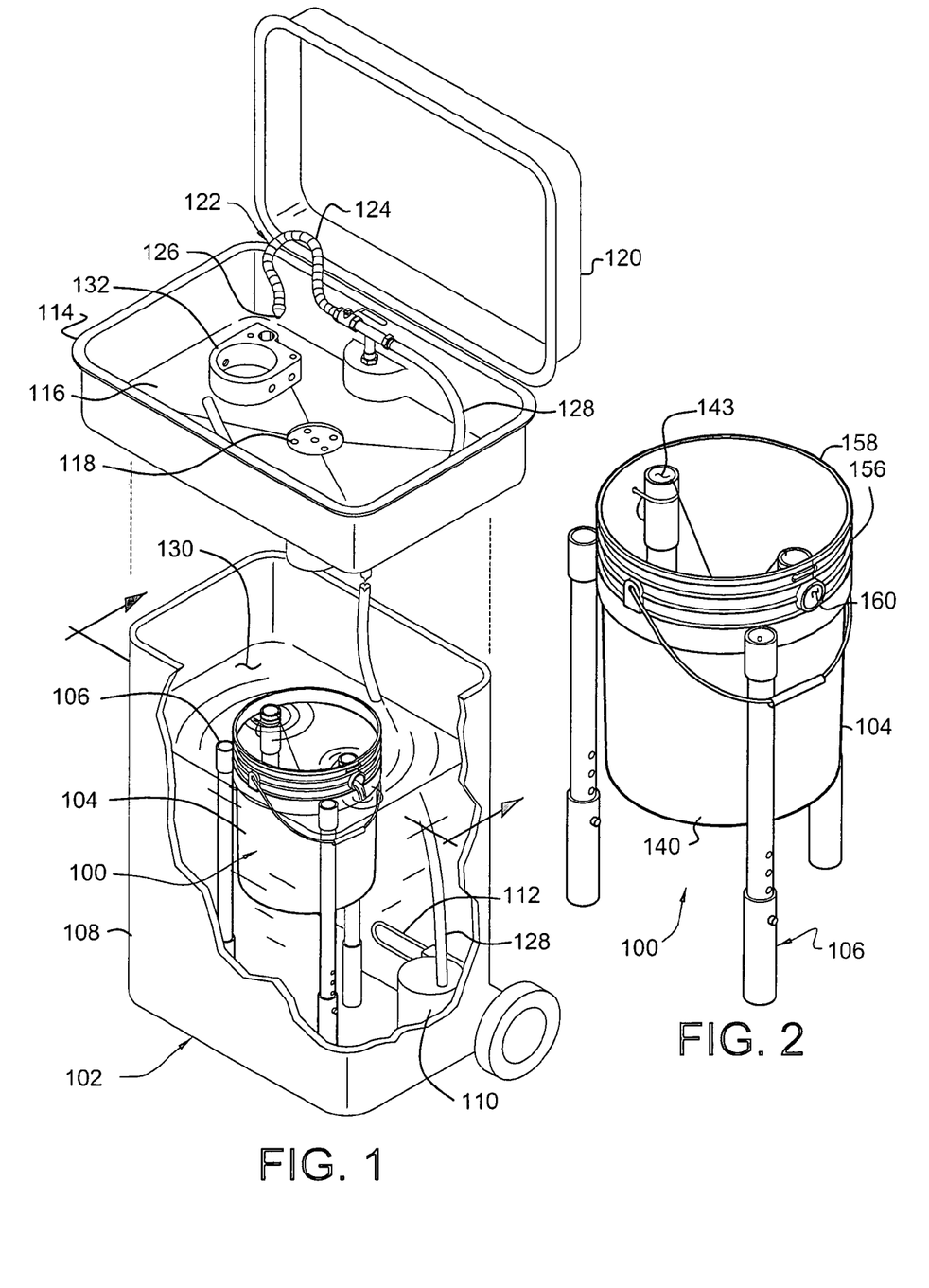
FIG. 1 shows a perspective view of the portable purifying system installed in a parts washer according to a preferred embodiment of the present invention.
FIG. 2 shows a perspective view of the portable purifying system of FIG. 1.
Figure 3:
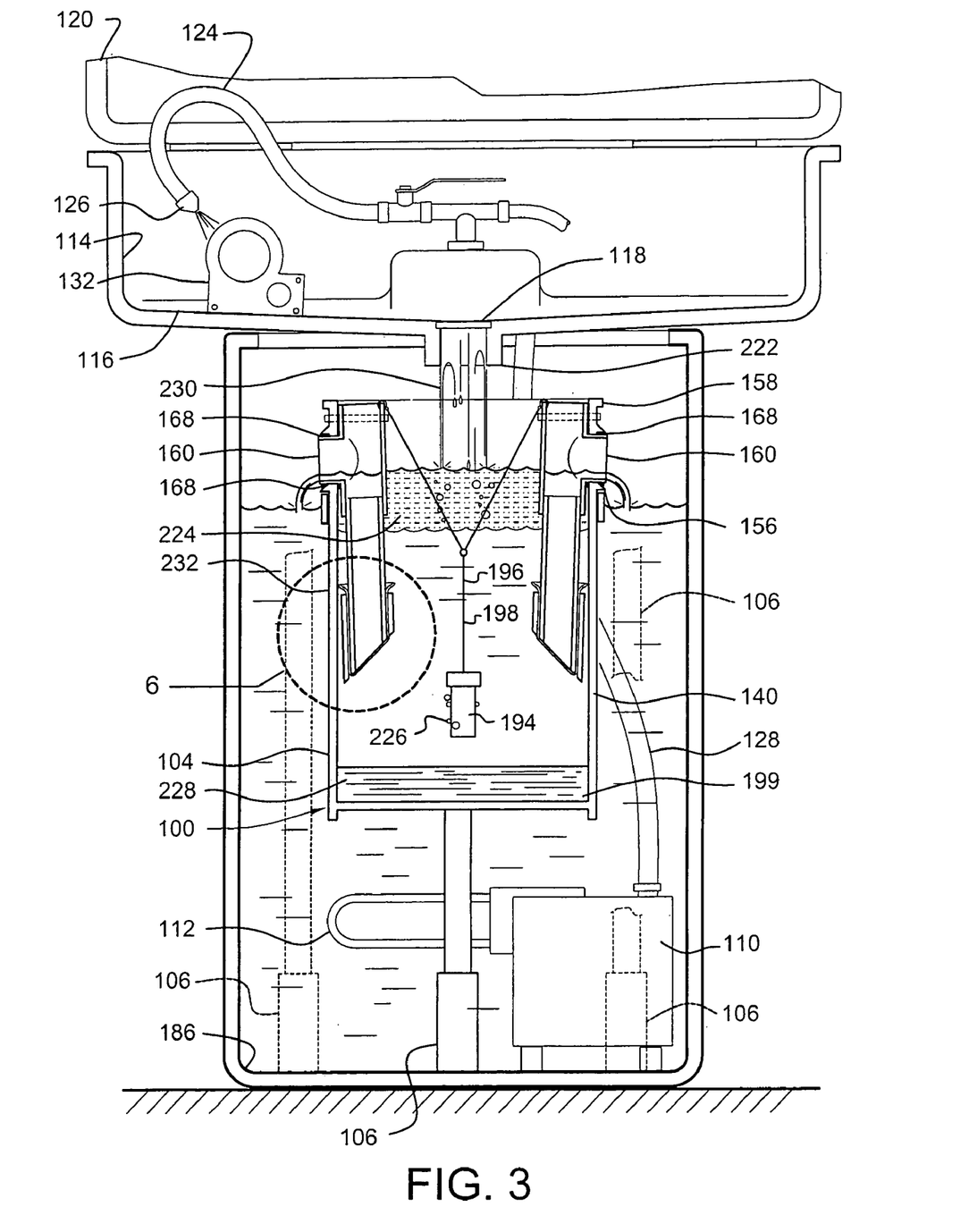
FIG. 3 shows a sectional view through section 3—3 of FIG. 1.

FIG. 1 is a perspective view of the portable purifying system 100 installed in a parts washer 102 according to a preferred embodiment of the present invention. FIG. 2 is a perspective view of the portable purifying system 100 of FIG. 1. FIG. 3 is a sectional view through section 3—3 of FIG. 1.

Preferably, the portable purifying system 100 comprises a reservoir assembly 104 and a support stand 106, as shown. Preferably, the portable purifying system 100 is utilized within a parts washer 102, as shown. Such parts washers 102 are preferable for use of the portable purifying system 100 and commonly comprise a reservoir 108 (at least embodying herein at least one second reservoir structured and arranged to hold essentially the at least one desired material, and at least embodying second reservoir means for holding essentially the at least one desired material) that further comprises a pump 110 and heating element 112, as shown. Furthermore, the parts washer 102 preferably comprises a washbasin 114, as shown. Preferably, the washbasin comprises a wash pan 116, having a drain 118 and a cover 120. Preferably, at least one nozzle assembly 122 is also provided, as shown. Preferably, the nozzle assembly 122 comprises a flexible conduit 124 having a nozzle end 126 and a supply conduit 128 attached to the pump 110 to draw cleaning fluid 130 (herein referred to as solvent 130) from within the reservoir 108, as shown.

As described above, the parts washer typically operates as follows: a part 132 is placed in washbasin 114; the parts washer circulating pump 110 is started as well as heater 128 (heat is used to increase the efficiency of the solvent in removing petroleum products such as grease and oil); the solvent is pumped to nozzle 126 and over and around part 132 (a brush may also be used at this time to scrub the part); the now "dirty" solvent 130 gravitates toward the drain 118 and, in prior art, flows into the reservoir 108. In a preferred embodiment of the present invention, the "dirty" solvent 130 gravitates toward the drain 118 but flows into the portable purifying system 100, as shown.

Preferably, the reservoir assembly 104 comprises a reservoir 140, preferably comprising a diameter (width) and depth preferably sized about equal to a 5-gallon plastic bucket (at least embodying herein wherein such at least one reservoir comprises one 5-gallon bucket), preferably rounded, as shown (this arrangement at least embodies herein first reservoir means, comprising a first configuration, at least one upper rim portion, at least one open top portion, and at least one side wall for collecting, through such at least one open top, at least one mixture comprising a first ratio of at least one desired material and at least one second ratio of at least one undesired material; and, it at least embodies herein at least one first reservoir, comprising a first configuration, at least one upper rim portion, at least one open top portion, and at least one side wall, adapted to collect, through such at least one open top, at least one mixture comprising a first ratio of at least one desired material and at least one second ratio of at least one undesired material). Preferably, reservoir 140 is portable such that it may be lifted by a person without the assistance of another person (at least embodying herein wherein such first reservoir is portable; and at least embodying herein wherein such first reservoir means is portable). Upon reading the teachings of this specification, those with ordinary skill in the art will now understand that, under appropriate circumstances, considering such issues as economics, user preference, etc., other means for portability, such as placing wheels along the bottom of the reservoir, using assistance to transfer the reservoir, etc., may suffice.

Such 5-gallon buckets are preferably high-density polyethylene (HDPE) (such as available from US Plastics Corporation www.usplastic.com 1390 Neubrecht Rd. Lima, Ohio 45801-3196; 1-800-809-4217) and may be hot-filled up to 190° F., steam sterilized or frozen. Preferably, all pails have a sturdy wire bail 136 with a plastic handgrip 138. Standard bucket measurements are about eleven and three-quarters inches in diameter at the top opening by about fourteen and one-eight inches high by about ten and three-eighths inches in diameter at the closed bottom of the bucket (this arrangement facilitates bucket stacking for easier storing of the buckets). The bucket wall thickness typically ranges from about one-eighth inch to about one-fourth inch. Upon reading the teachings of this specification, those with ordinary skill in the art will now understand that, under appropriate circumstances, considering such issues as economics, user preference, etc., other reservoir arrangements, such as functionally being able to provide a reservoir for gravity separation of the differing densities of material in the dirty solvent, etc., may suffice. For example, parts washers range in size and shape such that the capacity and shape of the reservoir 140 may also be altered without detracting from the intended function. In light of the teachings herein, those knowledgeable in such art may determine other such capacities and shapes for the reservoir 140. For example, a typical parts washer having a 15–35 gallon capacity may preferably use a 5-gallon reservoir (at least embodying herein wherein such at least one reservoir has a fluid capacity of about five gallons); however a parts washer having a smaller or larger capacity might preferably have a respectively smaller or larger capacity reservoir 140. Furthermore, such reservoir 140 needs to provide a deep enough reservoir to accommodate the gravitational separating of the cleaner solvent 130 from the dirty solvent (this arrangement at least embodies herein wherein such first configuration of such first reservoir means comprises such gravity means; and at least embodies herein wherein such first configuration of such at least one first reservoir comprises such at least one gravity separator). Preferably, the reservoir 140 comprises one-third to one-seventh of the total volume of the solvent 130 being used in the parts washer. A "smaller" reservoir 140 may lead to the portable purifying system 100 having to be "cleaned" more often. Such cleaning process will be further detailed below.

Figures 4, 5:
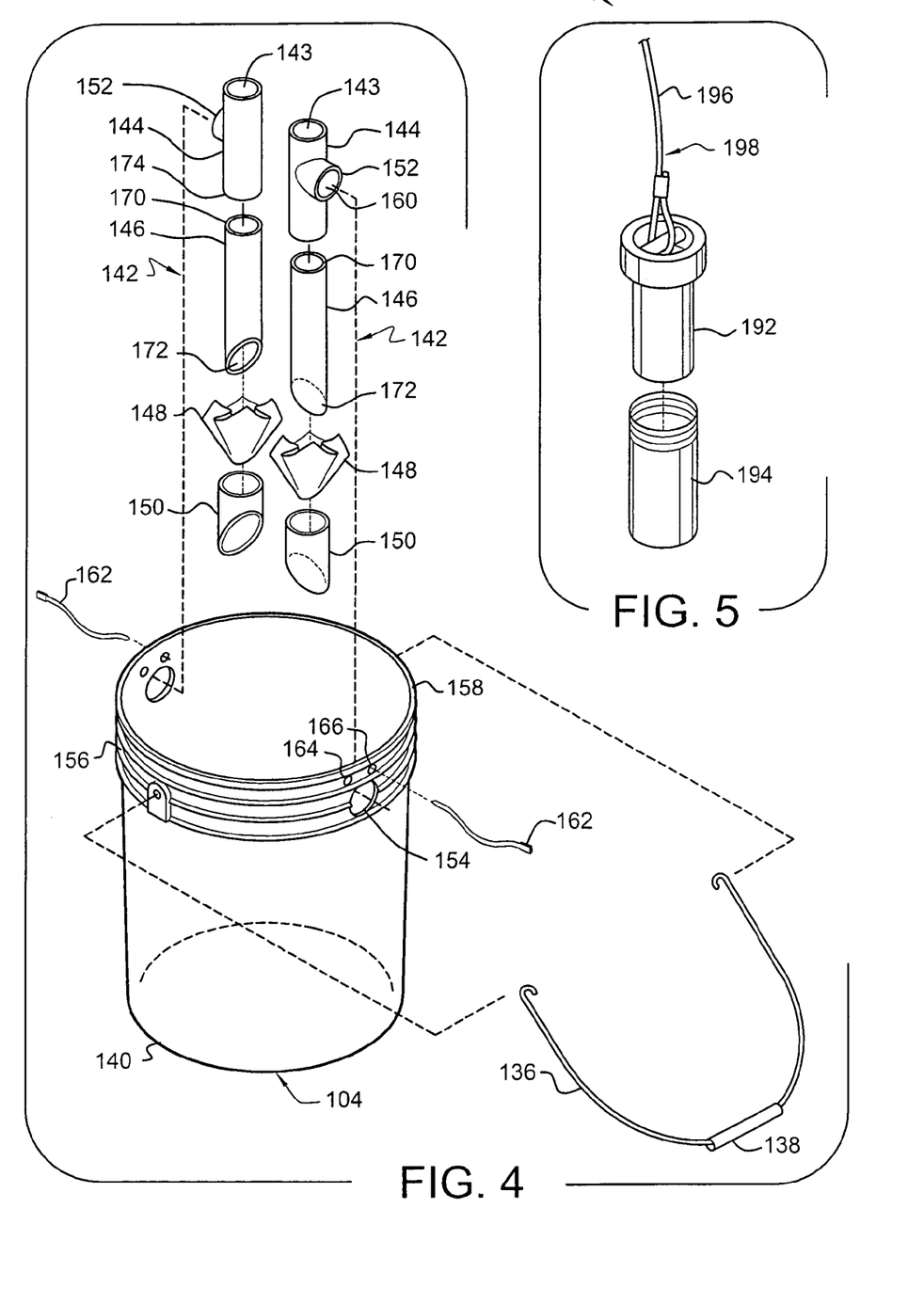
FIG. 4 shows an exploded perspective view of the reservoir of the portable purifying system of FIG. 2.
FIG. 5 shows a perspective view of a magnetic attractor of the portable purifying system of FIG. 3.

Reference is now made to FIG. 4 in addition to continued reference to the above Figures. FIG. 4 is an exploded perspective view of the reservoir of the portable purifying system of FIG. 2. Preferably, the reservoir assembly 104 further comprises two vertical cylinders 142, as shown (at least embodying herein retrieving means for retrieving, from at least one selected location in such at least one first reservoir means, a higher ratio of the at least one desired material; and at least embodying herein at least one retriever to retrieve from at least one selected location in such at least one first reservoir, a higher ratio of the at least one desired material). Most preferably, the vertical cylinders 142 are comprised of plastic, preferably a plastic that will not react with the solvent, most preferably polyvinyl chloride pipe (herein referred to as simply PVC pipe, most preferably, schedule 40 or above), as shown; however, under appropriate circumstances, other materials may suffice (the above arrangement at least embodies herein wherein such at least one vertical cylinder comprises PVC pipe). For example, in light of the teachings herein, those knowledgeable in such materials art may, under appropriate circumstances choose other materials that would suffice, such as, for example, high density polyethylene (herein referred to as HDPE), stainless steel, etc.

Preferably, the vertical cylinders 142 comprise a minimum inner diameter 143 of about one-inch (outlet portion shown is preferably one and one-quarter inch inner diameter to accommodate inlet portion 146, as shown). Upon reading the teachings of this specification, those with ordinary skill in the art will now understand that, under appropriate circumstances, considering such issues as economics, user preference, material availability, durability, etc., other inner diameters 143, may suffice. For example, the pipe inner diameter 143 must provide for a volume of solvent 130 to flow through the combined diameters of the vertical cylinders 142 at least equal to, or greater than, the pump 128 flow which is draining into the reservoir 140 or the reservoir 140 will overflow (such operation is further explained below). Upon reading the teachings of this specification, those with ordinary skill in the art will now understand that, under appropriate circumstances, considering such issues as economics, user preference, reservoir volume, bleed off preferences (if desired), etc., other parameters for determining the inner diameters 143, may suffice.

Preferably, each vertical cylinder 142 comprises an outlet portion 144 (at least embodying herein at least one outlet portion adapted to provide at least one outlet spill outside such at least one first reservoir), an inlet portion 146 (at least embodying herein at least one vertical cylinder, having at least one inlet portion to retrieve from at least one selected location in such at least one portable reservoir, a higher ratio of the at least one desired material), a filter 148 (at least embodying herein wherein such retrieving means comprises debris separating means for separating debris from the at least one desired material; and at least embodying herein wherein such retriever comprises at least one debris separator to separate debris from the at least one desired material) and a filter retainer 150, as shown. Preferably, the outlet portion 144 comprises a T-portion 152, preferably a PVC pipe T-fitting having about a 90-degree T-portion 152, as shown. Preferably, each of the above components (outlet portion 144, inlet portion 146, filter 148 and filter retainer 150) are then assembled and connected as herein described/shown.

Preferably, as best illustrated in FIG. 4, the outlet portion 152 inserts into an aperture 154 located along the top portion 156 of the reservoir 104, preferably about two and one-half inches from the top edge 158 of the reservoir 140 to the center of the outlet opening 160 such that the outlet opening 160 spills outside of the reservoir 140 (at least embodying herein outlet means for providing an outlet spill outside such first reservoir means; and at least embodying herein at least one outlet adapted to provide at least one outlet spill outside such at least one first reservoir), as shown. The above-described arrangement at least embodies herein wherein such retrieving means comprises substantially vertical cylinder means for forming at least one passageway from the at least one selected location to such outlet means, such outlet means being at least as high as at least one location adjacent such upper rim portion of such first reservoir means; and at least embodies herein wherein such at least one retriever comprises at least one substantially vertical cylinder to form at least one passageway from the at least one selected location to such at least one outlet, such at least one outlet being at least as high as at least one location adjacent such upper rim portion of such at least one first reservoir; and also at least embodies herein wherein such at least one vertical cylinder is attached to such at least one reservoir such that such at least one inlet portion draws from at least one selected location within such at least one reservoir and such at least one outlet portion outlets through such at least one side wall outside of such at least one reservoir.

Preferably, the outlet portion 152 is comprised of one-and one-quarter-inch inner-diameter pipe, preferably PVC pipe as described above, preferably about three and one-half inches in length, such that the inlet portion 146 will tightly and preferably "telescopically" fit into the outlet portion 152, as shown. Upon reading the teachings of this specification, those with ordinary skill in the art will now understand that, under appropriate circumstances, considering such issues as economics, user preference, material availability, size, etc., other dimensions and arrangements may suffice. Preferably, the outlet portion 152 is attached to the reservoir 140, preferably by use of a cable tie 162, as shown. Preferably the cable tie is made from heat-stabilized nylon and is weather (ultra-violet) resistant (for example, such as available from Talco Specialties www.talcospecialties.com). Preferably, a cable tie 162 is inserted through first aperture 164 and wrapped around the outlet portion 152 then inserted through the second aperture 166 then pulled tightly and clasped, as shown (see FIG. 2). Preferably, sealant 168 is then applied between the outlet opening 160 and the aperture 154. Preferably, the sealant 168 is allowed to dry, forming a permanent seal such that the aperture 154 is sealed and the outlet portion 152 is held to the reservoir 140 both by the cable tie 162 and sealant 168, as shown. Preferably, the sealant 168 is silicone, preferably clear (such as made by GE Silicone www.gesealants.com). Silicone provides a sealant that is water repellent, chemically inert and stable at extreme temperatures.

Figures 9, 10:
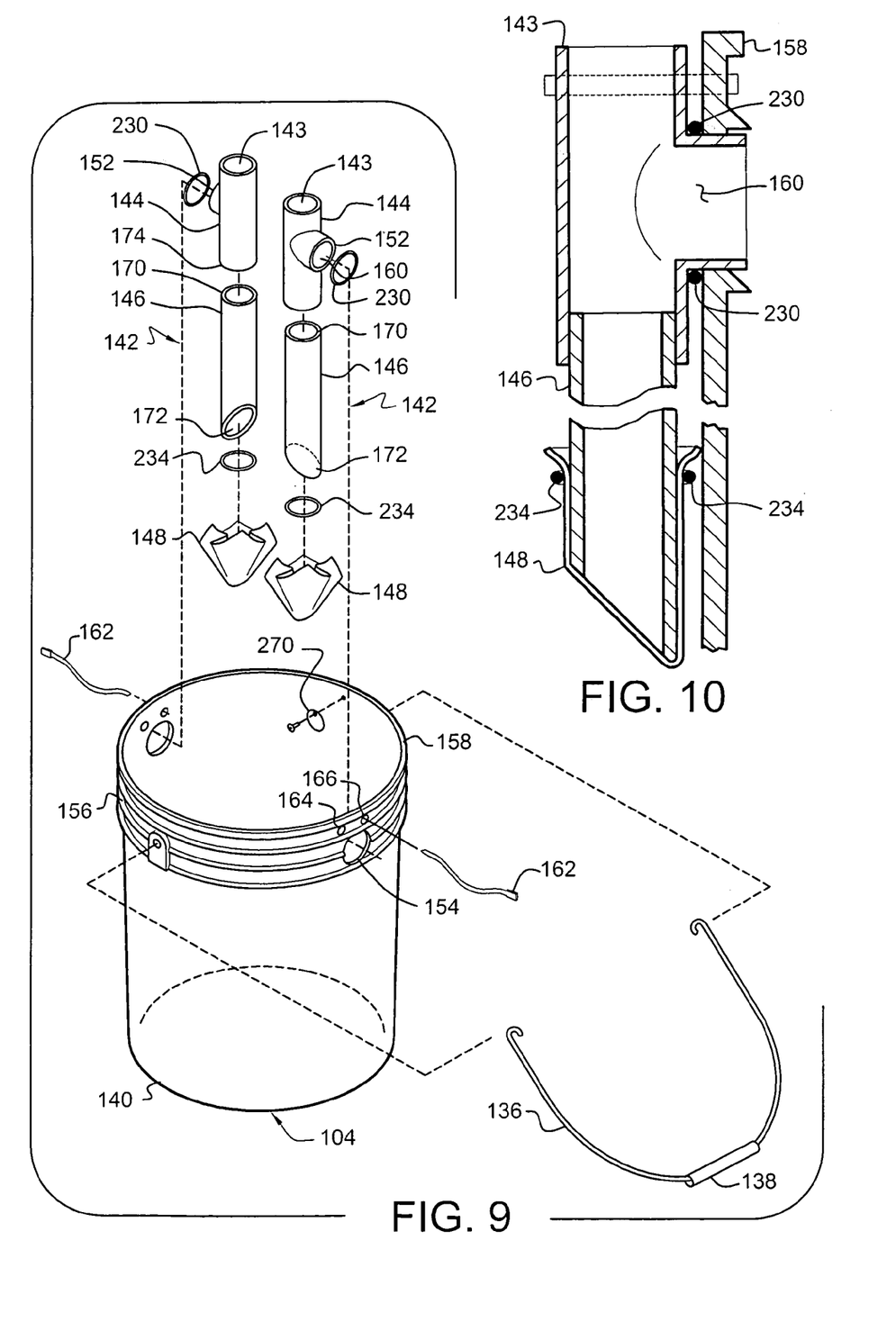
FIG. 9 shows an exploded perspective view of another embodiment of the reservoir of FIG. 4.
FIG. 10 shows a section view through an assembled vertical cylinder of the reservoir of FIG. 9.

FIG. 9 shows an exploded perspective view of another embodiment of the reservoir of FIG. 4. FIG. 10 shows a section view through an assembled vertical cylinder of the reservoir of FIG. 9. In another preferred embodiment shown in FIG. 9 and FIG. 10, an O-ring 230, preferably having an inner diameter just large enough to fit over the outlet portion 152 (one and one-quarter inch inner diameter pipe in the above described preferred embodiment of FIG. 1) and preferably resistant to the solvent in the reservoir 104 for example, preferably neoprene. Preferably, the O-ring 230 is used to seal the outlet opening 160 and the aperture 154, as shown (at least embodying herein at least one second O-ring adapted to provide at least one seal between said at least one outlet portion and said at least one side wall of said at least one reservoir). Upon reading the teachings of this specification, those with ordinary skill in the art will now understand that, under appropriate circumstances, considering such issues as economics, user preference, etc., other sealing arrangements to seal the outlet opening 160 and the aperture 154 may suffice.

Preferably, in the described embodiment, the inlet portion 146 comprises one-inch-inner-diameter pipe, preferably PVC pipe as described above, preferably about six and one-half inches in length. Preferably, the inlet portion 146 comprises one flat-cut end 170 perpendicular to a longitudinal axis of the inlet portion 146, as shown. Preferably, the inlet portion 146 comprises one forty-five-degree cut end 172 that is angled at a forty-five degree angle to a longitudinal axis of the inlet portion 146, as shown. Under appropriate circumstances, other arrangements may suffice. In light of the teachings herein, those knowledgeable in such art may choose to increase or decrease the cut angles, provided their function is maintained. Applicant has found the approximate preferred angles to be well-suited for multiple functions (for example, ease of solvent flow through the pipe, ease of assembly-disassembly with other components, increased filter surface area, lighter oil flow along the filter media and minimal blockage (as the solvent is circulated).

It is noted that the above-described reservoir 140 at least embodies herein at least one portable reservoir comprising a first configuration, at least one upper rim portion, at least one open top portion, and at least one side wall, adapted to collect, through such at least one open top, at least one mixture comprising a first ratio of at least one desired material and at least one second ratio of at least one undesired material.

Preferably, the flat-cut end 170 will tightly, slidably insert into the bottom end 174 of the outlet portion 152, as shown. Preferably, a filter 148 and a filter retainer 150 are connected to the forty-five-degree cut-end 172, as shown.

Preferably, the filter 148 is an "oil only" polypropylene filter (such as available from Kleentec; www.Kleetec.com). This arrangement at least embodies herein at least one filter comprising polypropylene structured and arranged to filter oils from the at least one such desired material. This arrangement also at least embodies herein wherein such filtering means comprises polypropylene means for filtering oils from at least one such desired material. Preferably, the filter 148 stops oil and larger particles from entering the inlet portion 146 (at least embodying herein at least one oil-blocking filter removably covering such at least one inlet). Preferably, the filter 148 is placed over the forty-five-degree cut end 172 and the filter retainer 150 is placed over the filter 148 and then slidably pushed onto and over both the filter and the forty-five-degree cut end 172 of the inlet portion 146, as shown. Preferably, the filter retainer 150 comprises one flat-cut end 176 perpendicular to a longitudinal axis of the filter retainer 150 and one forty-five-degree cut-end 178 that is angled at a forty-five degree angle to a longitudinal axis of the filter retainer 150, as shown. Preferably, the forty-five-degree cut end 178 is aligned and matched in shape to the forty-five-degree cut end 172, as shown. Upon reading the teachings of this specification, those with ordinary skill in the art will now understand that, under appropriate circumstances, considering such issues as economics, user preference, viscosity of the solvent, etc., other cut-end 172 and 178 arrangements, such as more or less than forty-five-degrees, etc., may suffice.

In an alternate preferred embodiment, shown in FIG. 9 and FIG. 10, an O-ring 234 is used to hold filter 148 in lieu of filter retainer 150, as shown (at least embodying herein at least one first O-ring adapted to removably couple said at least one oil-blocking filter to said at least one inlet). Preferably, the filter 148 is placed over the forty-five-degree cut end 172 and the filter retainer 150 is placed over the filter 148 and then slidably pushed onto and over both the filter and the forty-five-degree cut end 172 of the inlet portion 146, as shown. Upon reading the teachings of this specification, those with ordinary skill in the art will now understand that, under appropriate circumstances, considering such issues as economics, user preference, etc., other filter retaining arrangements may suffice.

Figure 6:
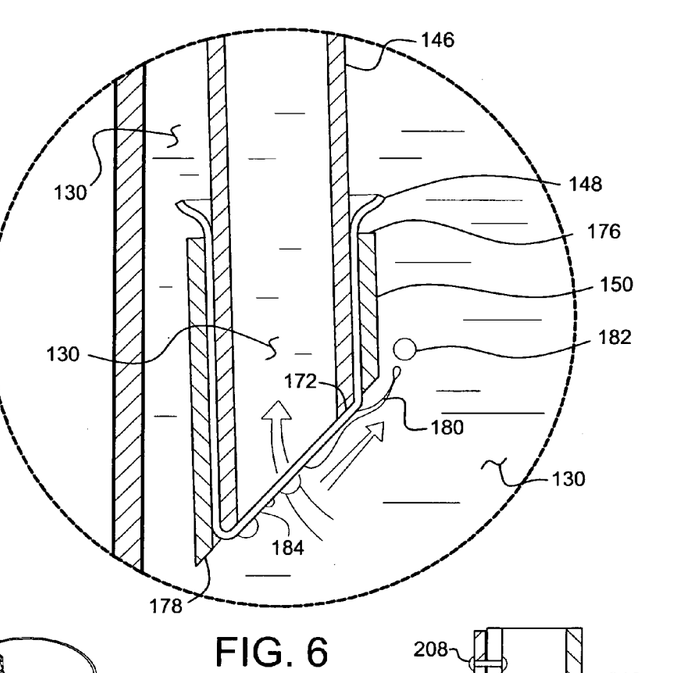
FIG. 6 shows a detail view of detail 6—6 of FIG. 3.

FIG. 6 is a sectional view through detail 6—6 of FIG. 3. FIG. 6 illustrates the above-described assembly of the filter 148 and filter assembly 150. Preferably, as the solvent 130 passes through the filter 148 into the inlet portion 146, the oils 180 are trapped by the filter 148 and as the oils 180 form droplets 182 along the filter surface 184, they start to gravitate upward towards the top portion 156 of the reservoir 104, as shown (this arrangement at least embodies herein wherein such retrieving means comprises filtering means restricting passage of the at least one such undesired material; and at least embodies herein wherein such at least one retriever comprises at least one filter restricting passage of the at least one such undesired material). Preferably, the oils 180 are less dense than the solvent 130. In such instances when the oils 180 are denser than the solvent 130, they preferably gravitate towards the bottom 186 of the reservoir 104.

Preferably, the reservoir assembly 104 further comprises a magnetic attractor 190. FIG. 5 is a perspective view of a magnetic attractor 190 of the portable purifying system 100 of FIG. 3. Preferably, the magnetic attractor 190 (at least embodying herein at least one magnetic attractor located within or closely adjacent such at least one reservoir) comprises a magnet 192, preferably a rare-earth magnet, preferably about three-quarters to one-inch in diameter and preferably about one-inch or larger in length. Preferably, the magnetic attractor 190 is placed within a sealable container 194, preferably plastic, preferably only slightly larger than the magnet 192, as shown. Preferably, the magnetic attractor 190 comprises a hanger assembly 196 such that the magnetic attractor 190 may be suspended in the reservoir 104, as shown. Most preferably the magnetic attractor 190 is suspended within the solvent 130 about two to about four inches above the bottom 186, as shown (at least embodying herein wherein such at least one magnetic attractor is located near at least one bottom portion of such at least one reservoir). Preferably, the hanger assembly 196 is suspended by cable 198, preferably suspended from vertical cylinders 142, as shown. Cable 198 is preferably metal; however, plastic or other material that will not react with the solvent may suffice.

It is noted that, in light of the teachings herein, those knowledgeable in such art may determine that, under appropriate circumstances with regard to reservoir 140 sizes and expected metallic content of the solvent 130, other sizes, containers, placement and types of magnets may suffice.

Preferably, the magnetic attractor 190 attracts metals that are washed into reservoir 140 and magnetically draws them towards the bottom 199 of the reservoir 140 or towards the magnet 192. Preferably, the parts congregate around the sealable container 194. Preferably, a user may clean the container by simply lifting it out of the reservoir 140, removing the magnet 192 and wiping off the now de-magnetized container 194, as shown. Preferably, a non-magnetic material, such as plastic, is used for the container 194 such that this cleaning process is easy. Applicant has determined that utilizing a magnet 192 without the container 194 causes cleaning of the metals from the magnet 192 to be quite time-consuming and messy. Upon reading the teachings of this specification, those with ordinary skill in the art will now understand that, under appropriate circumstances, considering such issues as economics, user preferences, material availability, etc., other types of magnets and magnet arrangements, etc., such as magnetic materials, electro-magnets, etc., may suffice.

Figure 7:
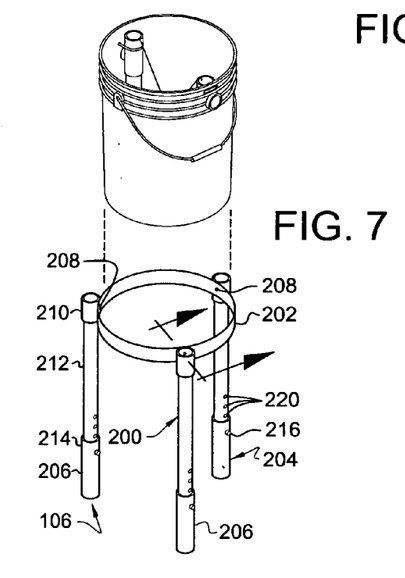
FIG. 7 shows an exploded perspective view of the support stand of the portable purifying system of FIG. 1.
Figure 8:
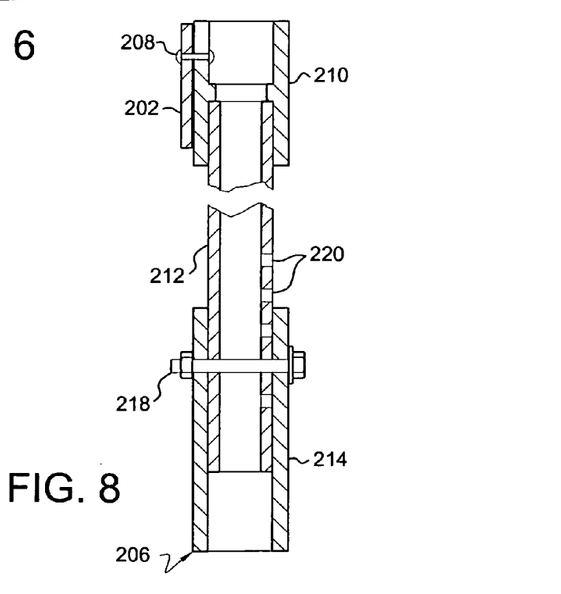
FIG. 8 shows a sectional view through section 8—8 of FIG. 7.

Reference is now made to FIG. 7 and FIG. 8 with continued reference to the above-described Figures. FIG. 7 is an exploded perspective view of the support stand 200 of the portable purifying system 100 of FIG. 1. FIG. 8 is a sectional view through section 8—8 of FIG. 7. Preferably, the reservoir assembly 104 is elevated above the bottom 186 of the parts washer reservoir 108, as shown (at least embodying herein wherein such at least one first reservoir is removably situate within such at least one second reservoir; and at least embodying herein wherein such first reservoir means is removably situate within such second reservoir means; and at least embodying herein at least one support means for supporting such first reservoir means within such second reservoir means). Preferably, a support stand 106 is utilized for elevating the reservoir assembly 104 (this arrangement at least embodying herein at least one support adapted to support such at least one first reservoir within such at least one second reservoir). Preferably, the reservoir assembly 104 is removable from the support stand 200 to facilitate cleaning of the reservoir assembly 104 and its components, such as filters 148 (cleaning or replacement), magnetic attractor 190, and cleaning and replacement of the solvent in the reservoir 140. This arrangement at least embodies herein wherein such at least one reservoir is removably supported by such at least one support.

Preferably, the support stand 106 comprises an annular band 202 having a diameter of about eleven to eleven and one-half inches to fit a 5-gallon bucket as described above (at least embodying herein at least one support, having at least one circumferential band and at least three support legs attached to such at least one circumferential band), as shown. Such 5-gallon buckets are preferably tapered and stackable, as shown. The present embodiment takes advantage of the taper in utilizing the reservoir support stand 106, as shown. Preferably, the annular band 202 is metallic, preferably galvanized steel. Upon reading the teachings of this specification, those with ordinary skill in the art will now understand that, under appropriate circumstances, considering such issues as economics, user preference, shipping weight, etc., other materials, such as plastic, etc., may suffice. Preferably, the support stand 106 also comprises a leg support 204, preferably three legs 206, preferably adjustable in height, as shown. Preferably, each leg 206 is attached to the annular band 202 with a rivet 208, as shown. Upon reading the teachings of this specification, those with ordinary skill in the art will now understand that, under appropriate circumstances, considering such issues as economics, user preference, materials, etc., other attachment arrangements, may suffice.

Preferably, each leg 206 comprises an upper attachment 210, a center section 212 and an optional adjustment portion 214, as shown. Preferably, the center section 212 is made from one-inch-diameter PVC pipe (at least embodying herein wherein such at least three support legs comprise PVC pipe). Preferably, the upper attachment 210 is a one-inch PVC connector, having a one-inch inner diameter. Preferably, the optional adjustment portion 214 is one and one-quarter inch PVC pipe having a one-inch inner diameter. Preferably, the upper attachment 210, a center section 212 and an optional adjustment portion 214 slidably fit into each other, as shown. The upper attachment 210 and center section 212 may be glued together, if desired, under appropriate circumstances. When an adjustment portion 214 is used, the center section 212 is preferably drilled to provide a plurality of apertures 216 for use in adjusting the height of the legs 206, as shown (at least embodying herein at least one height adjuster structured and arranged to adjust the height of such at least one support). Preferably, a bolt and nut assembly 218 is placed through an aperture 216 and through an aperture 220 in leg 206 and connected to hold the leg in a desired position, as shown. In light of the teachings herein, those knowledgeable in such art may determine that, under appropriate circumstances, with regard to the support of the reservoir assembly 104, other arrangements may suffice.

Figure 11:
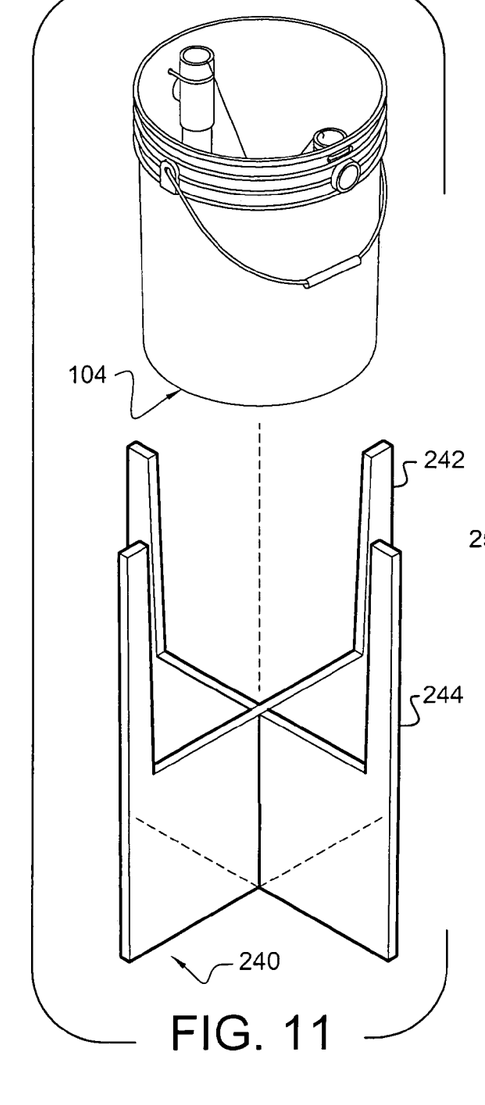
FIG. 11 shows a perspective view of the support stand of the portable purifying system according to another preferred embodiment of the present invention.
Figure 12:
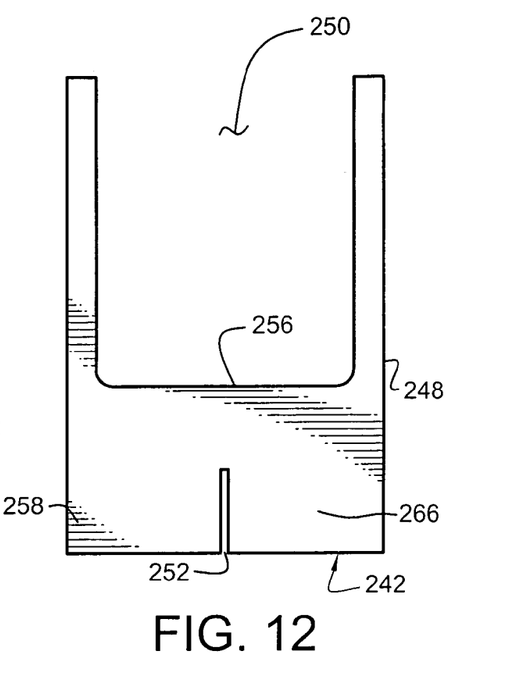
FIG. 12 shows a front view of a first panel of the support stand of FIG. 11.
Figure 13:
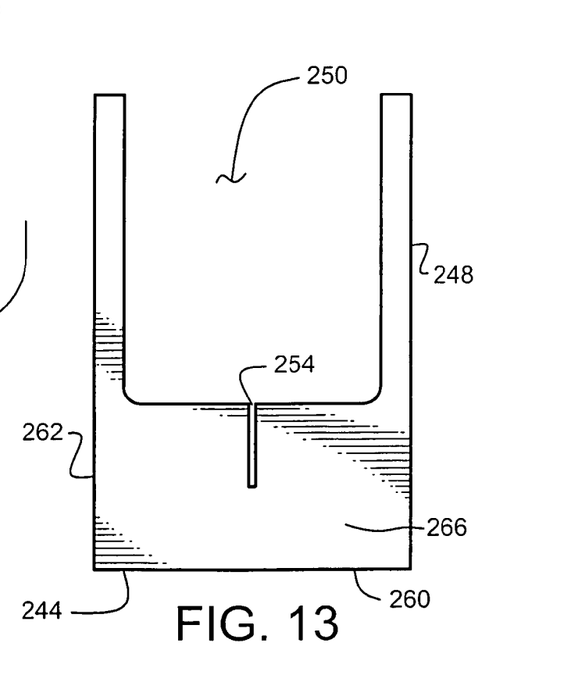
FIG. 13 shows a front view of a second panel of the support stand of FIG. 11.

FIG. 11 shows a perspective view of the support stand of the portable purifying system according to another preferred embodiment of the present invention. FIG. 12 shows a front view of a first panel of the support stand of FIG. 11. FIG. 13 shows a front view of a second panel of the support stand of FIG. 11. In another preferred embodiment of the support stand 106, support stand 240 is a knockdown, non-adjustable support for reservoir 104, as shown. Preferably, support stand 240 comprises a first panel 242 and a second panel 244, as shown. Preferably, both the first panel 242 and second panel 244 comprise rectangular-shaped perimeter 248, preferably about fourteen inches wide by about twenty inches in height, having a substantially U-shaped cutout 250, as shown. Preferably, the U-shaped cutout 250 is about eleven inches in depth and about eleven and one-half inches in width to accommodate a 5-gallon bucket, as shown. Upon reading the teachings of this specification, those with ordinary skill in the art will now understand that, under appropriate circumstances, considering such issues as economics, user preference, reservoir size, etc., other dimensions for the U-shaped cutout 250 may suffice. Preferably, both the first panel 242 and second panel 244 comprise a chemically resistant material such as, for example, polyacrylate (for example, Lucite®), preferably about three-eighths inch in thickness. Upon reading the teachings of this specification, those with ordinary skill in the art will now understand that, under appropriate circumstances, considering such issues as economics, user preference, material availability, durability, machining costs, etc., other materials, such as HDPE, PVC, etc., may suffice.

Preferably, the first panel 242 and second panel 244 comprise coupling slots 252 and 254 to provide a means for coupling the preferably flat panels together, as shown. Preferably, slot 252 is situate about the center 256 of the bottom portion 258 of the first panel 242, as shown. Preferably, the slot 252 is slightly wider than the width of the material of the second panel 244. Preferably, slot 254 is situate about the center 260 of the top portion 262 of the second panel 244, as shown. Preferably, the slot 254 is slightly wider than the width of the material of the first panel 242. Preferably, each slot 242 and 244 are about one half the distance of the base portion 266, preferably about four and one-half inches in length, such that when the first panel 242 is placed over the second panel 244 in a perpendicular arrangement, as shown, the slot 252 slides through the slot 254 and each respective slot 252 and 254 tightly fits to the respective remaining base portion 266, as shown. In such manner, the first panel 242 and second panel 244 complete a support stand 240 having a substantially flat standing bottom and structured and arranged to hold a 5-gallon reservoir 104, as shown.

Preferably, an identifying plate 270 is permanently attached to each reservoir 104, preferably along the top portion, as shown. Preferably, the identifying plate 270 comprises a number or bar code to track the individual reservoir for usage and performance. In addition, the identifying plate 270 may comprises patent number or patent pending indicia.

Reference is now made to all of the above Figures with particular reference to FIG. 3 to illustrate a preferred operation of the portable purifying system 100. Preferably, the reservoir 140 is placed into the reservoir 108, as shown (at least embodying herein means for providing a smaller reservoir within a larger reservoir). Preferably, the reservoir support stand 106 is adjusted in height such that the reservoir assembly 104 will be under the drain 118 with about two to about six inches of clearance between the top edge 158 of the reservoir 140 and the bottom 222 of the drain 118, as shown. Under appropriate circumstances, other clearance arrangements may suffice. For example, the reservoir may also be removably attached to the washbasin (at least embodying herein wherein such first reservoir means is removably attached to at least one wash basin). Most preferably, the outlet openings 160 are higher than the level of solvent 130 in the reservoir 108 of the parts washer 102, as shown. Preferably, the reservoir 140 is next placed into the reservoir support stand 106, as shown. Preferably, the parts washer 102 is already filled with solvent, preferably to a height as recommended by the parts washer manufacturer, however less than a height that would hinder the portable purifying system 100 from being effective (meaning the height of the solvent in the reservoir 108 must preferably be lower than the outlet openings 160 as described above).

Preferably, the parts washer pump 110 is activated and the solvent 130 begins to re-circulate. Preferably, a part 132 is placed in wash basin 114 (at least embodying herein at least one wash basin) and the nozzle end 126 is directed towards the part 132, as shown. Preferably, as the solvent 130 washes over the part 132, a mixture 230 comprising the solvent 130 (a desired portion of the mixture), oily residue 224, metals 226, sludge 228 and other loose debris (together comprising an undesired portion of the mixture) are washed down the drain 118 and into the reservoir 140 of the portable purifying system 100, as shown (at least embodying herein means for using re-circulating solvent from the larger reservoir, washing oily parts in such manner that oily residue from the washed parts is deposited in the smaller reservoir). Preferably, as the solution 230 enters the reservoir 140, the differing densities and materials of the solution 230 separate, as shown. This arrangement at least embodies herein wherein such first configuration of such at least one reservoir comprises at least one gravity separator to use gravity to separate differing densities among the at least one first ratio of the at least one desired material and the at least one second ratio of the at least one undesired material. This arrangement also at least embodies herein means for using density differences to separate by gravity action cleaner portions from dirtier portions.

Preferably, the heavier metals 226, including magnetic and non-magnetic metals, move towards the bottom 199 of the reservoir 140, preferably by gravity means, which naturally separate the materials (the above described arrangement at least embodies herein gravity means for using gravity to separate differing densities among the at least one first ratio of the at least one desired material and the at least one second ratio of the at least one undesired material; and at least embodies herein at least one gravity separator to use gravity to separate differing densities among the at least one first ratio of the at least one desired material and the at least one second ratio of the at least one undesired material), as well as through the use of the magnetic attractor 190. Preferably, the magnetic attractor 190 assists in attracting such magnetic material towards the bottom 199 and towards the magnetic attractor 190, as shown. Preferably, the heavier sludge 228 also moves toward the bottom 199, as shown.

The oily residue 224 moves toward the top portion 156 such that the oily residue is suspended above the majority of the solvent 130, as shown (the above arrangement at least embodies herein means within the smaller reservoir, for separating cleaner portions of solvent from dirtier portions of solvent). Preferably, the majority of the solvent 130 resides in the middle portion 232 of the reservoir 140. Under appropriate circumstances, other arrangements may suffice. For example, if a lighter or denser solvent is used the majority of the solvent (or other desired material) might reside in other portions.

Preferably, vertical cylinders 142 are placed in about the middle of the cleanest portions of the solvent 130, as shown. Preferably, the cleaner solvent 130 is further filtered by the filter 148 as the solvent 130 moves upward through the vertical cylinders 142 (such movement of the fluid in the reservoir and upward through the vertical cylinders, as the fluid level in the reservoir rises, occurring by well-known fluid-flow dynamics which will not be further detailed herein) and outward through the outlet opening 160, as shown (at least embodying herein means for moving the cleaner portions of solvent into the larger reservoir).

Preferably, at regular intervals (based on usage) the reservoir 140 is periodically emptied of all contents and cleaned (at least embodying herein means for periodically emptying and cleaning the smaller reservoir). Preferably, the filters 148 are cleaned as they get soiled and the magnetic attractor 190 is cleaned as metals 226 surround it. Preferably, the amount of solvent 130 added to the portable purifying system 100 is only about as much as is removed during such cleaning.

It is noted that the above-described steps at least embody herein a portable purifying system comprising, in combination, the steps of: providing a smaller reservoir within a larger reservoir; using re-circulating solvent from the larger reservoir, washing oily parts in such manner that oily residue from the washed parts is deposited in the smaller reservoir; within the smaller reservoir, separating cleaner portions of solvent from dirtier portions of solvent; moving the cleaner portions of solvent into the larger reservoir; and periodically emptying and cleaning the smaller reservoir; and using density differences to separate by gravity action cleaner portions from dirtier portions.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A portable purifying system comprising, in combination:
   a) first reservoir means, comprising a first configuration, at least one upper rim portion, at least one open top portion, and at least one side wall, for collecting, through said at least one open top, at least one mixture comprising a first ratio of at least one desired material and at least one second ratio of at least one undesired material;
   b) gravity means for using gravity to separate differing densities among the at least one first ratio of the at least one desired material and the at least one second ratio of the at least one undesired material;
   c) retrieving means for retrieving, from at least one selected location in said first reservoir means, a higher ratio of the at least one desired material; and
   d) outlet means for providing an outlet spill outside said first reservoir means;
   e) wherein said retrieving means comprises debris separating means for separating debris from the at least one desired material;

f) wherein said first configuration of said first reservoir means comprises said gravity means; and g) wherein said retrieving means comprises substantially vertical cylinder means for forming at least one passageway from the at least one selected location to said outlet means, said outlet means being at least as high as at least one location adjacent said upper rim portion of said first reservoir means.

2. The purifying system according to claim 1 further comprising:
   a) second reservoir means for holding essentially the at least one desired material;
   b) wherein said first reservoir means is removably situate within said second reservoir means.

3. The purifying system according to claim 1 wherein said retrieving means comprises filtering means restricting passage of the at least one such undesired material.

4. A portable purifying system comprising, in combination:
   a) at least one first reservoir, comprising a first configuration, at least one upper rim portion, at least one open top portion, and at least one side wall, adapted to collect, through said at least one open top, at least one mixture comprising a first ratio of at least one desired material and at least one second ratio of at least one undesired material;
   b) at least one gravity separator to use gravity to separate differing densities among the at least one first ratio of the at least one desired material and the at least one second ratio of the at least one undesired material;
   c) at least one retriever to retrieve from at least one selected location in said at least one first reservoir, a higher ratio of the at least one desired material; and
   d) at least one outlet adapted to provide at least one outlet spill outside said at least one first reservoir;
   e) wherein said retriever comprises at least one debris separator to separate debris from the at least one desired material;
   f) wherein said first configuration of said at least one first reservoir comprises said at least one gravity separator; and
   g) wherein said at least one retriever comprises at least one substantially vertical cylinder to form at least one passageway from the at least one selected location to said at least one outlet, said at least one outlet being at least as high as at least one location adjacent said upper rim portion of said at least one first reservoir.

5. The purifying system according to claim 4 further comprising:
   a) at least one second reservoir structured and arranged to hold essentially the at least one desired material;
   b) wherein said at least one first reservoir is removably situate within said at least one second reservoir.

6. The purifying system according to claim 5 further comprising at least one support adapted to support said at least one first reservoir within said at least one second reservoir.

7. The purifying system according to claim 4 wherein said at least one retriever comprises at least one filter restricting passage of the at least one such undesired material.

8. The purifying system according to claim 7 wherein said at least one filter comprises polypropylene structured and arranged to filter oils from the at least one such desired material.

9. The purifying system according to claim 4 wherein said at least one first reservoir is portable.

10. The purifying system according to claim 4 wherein said at least one first reservoir is removably attached to at least one wash basin.

11. A portable purifying system comprising, in combination:
    a) at least one portable reservoir comprising a first configuration, at least one upper rim portion, at least one open top portion, and at least one side wall, adapted to collect, through said at least one open top, at least one mixture comprising a first ratio of at least one desired material and at least one second ratio of at least one undesired material;
    b) at least one vertical cylinder, having
       i) at least one inlet portion to retrieve from at least one selected location in said at least one portable reservoir, a higher ratio of the at least one desired material, and
       ii) at least one outlet portion adapted to provide at least one outlet spill outside said at least one first reservoir;
    c) wherein said at least one vertical cylinder is attached to said at least one reservoir such that said at least one inlet portion draws from at least one selected location within said at least one reservoir and said at least one outlet portion outlets through said at least one side wall outside of said at least one reservoir; and
    d) wherein said first configuration of said at least one reservoir comprises at least one gravity separator to use gravity to separate differing densities among the at least one first ratio of the at least one desired material and the at least one second ratio of the at least one undesired material.

12. The purifying system according to claim 11 further comprising at least one oil-blocking filter removably covering said at least one inlet.

13. The purifying system according to claim 12 further comprising at least one first O-ring adapted to removably couple said at least one oil-blocking filter to said at least one inlet.

14. The purifying system according to claim 13 further comprising at least one second O-ring adapted to provide at least one seal between said at least one outlet portion and said at least one side wall of said at least one reservoir.

15. The purifying system according to claim 12 further comprising at least one magnetic attractor located within or closely adjacent said at least one reservoir.

16. The purifying system according to claim 15 wherein said at least one magnetic attractor is located near at least one bottom portion of said at least one reservoir.

17. The purifying system according to claim 16 wherein said at least one reservoir has a fluid capacity of about five gallons.

18. The purifying system according to claim 17 wherein said at least one reservoir comprises one 5-gallon bucket.

19. The purifying system according to claim 16 further comprising at least one wash basin.

20. The purifying system according to claim 19 further comprising:
    a) at least one support, having at least one circumferential band and at least three support legs attached to said at least one circumferential band;
    b) wherein said at least one reservoir is removably supported by said at least one support.

21. The purifying system according to claim 20 further comprising at least one height adjuster structured and arranged to adjust the height of said at least one support.

22. The purifying system according to claim 19 further comprising at least one support, having at least one first panel and at least one second panel, adapted to support said at least one reservoir and adapted to be transported substantially flat.

23. A portable purifying system comprising, in combination:
   a) means for providing a smaller reservoir within a larger reservoir;
   b) means for using re-circulating solvent from the larger reservoir, washing oily parts in such manner that oily residue from the washed parts is deposited in the smaller reservoir;
   c) means, within the smaller reservoir, for separating cleaner portions of solvent from dirtier portions of solvent;
   d) means for moving the cleaner portions of solvent into the larger reservoir;
   e) means for using density differences to separate by gravity action cleaner portions from dirtier portions; and
   f) means for periodically emptying and cleaning the smaller reservoir.

24. A portable purifying system comprising, in combination the steps of:
   a) providing a smaller reservoir within a larger reservoir;
   b) using re-circulating solvent from the larger reservoir, washing oily parts in such manner that oily residue from the washed parts is deposited in the smaller reservoir;
   c) within the smaller reservoir, separating cleaner portions of solvent from dirtier portions of solvent;
   d) moving the cleaner portions of solvent into the larger reservoir;
   e) using density differences to separate by gravity action cleaner portions from dirtier portions; and
   f) periodically emptying and cleaning the smaller reservoir.

* * * * *